(12) United States Patent
Huang et al.

(10) Patent No.: US 10,602,464 B2
(45) Date of Patent: Mar. 24, 2020

(54) BLUETOOTH ASSISTED NAN CLUSTER DISCOVERY

(71) Applicant: INTEL CORPORATION, Santa Clara, CA (US)

(72) Inventors: Po-Kai Huang, Santa Clara, CA (US); Robert Stacey, Portland, OR (US); Carlos Cordeiro, Portland, OR (US); Emily H. Qi, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/412,919

(22) Filed: Jan. 23, 2017

(65) Prior Publication Data

US 2017/0289741 A1 Oct. 5, 2017

Related U.S. Application Data

(63) Continuation of application No. 14/318,463, filed on Jun. 27, 2014, now Pat. No. 9,554,344.

(Continued)

(51) Int. Cl.
| | |
|---|---|
| *H04W 4/00* | (2018.01) |
| *H04W 56/00* | (2009.01) |
| *H04W 52/02* | (2009.01) |
| *H04W 40/24* | (2009.01) |
| *H04W 4/80* | (2018.01) |

(Continued)

(52) U.S. Cl.
CPC .......... *H04W 56/00* (2013.01); *H04W 4/80* (2018.02); *H04W 8/005* (2013.01); *H04W 40/244* (2013.01); *H04W 48/12* (2013.01); *H04W 52/0216* (2013.01); *H04W 52/0225* (2013.01); *H04W 56/001* (2013.01); *H04W 72/1289* (2013.01); *H04W 84/18* (2013.01); *H04W 92/18* (2013.01); *Y02D 70/00* (2018.01); *Y02D 70/1224* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01);

(Continued)

(58) Field of Classification Search
CPC ....... H04W 56/00; H04W 4/80; H04W 48/12; H04W 72/1289; H04W 52/0216; H04W 56/001; H04W 40/244; H04W 8/005; H04W 52/0225; H04W 92/18; H04W 84/18; Y02D 70/162; Y02D 70/1244; Y02D 70/1246; Y02D 70/146; Y02D 70/1264; Y02D 70/144; Y02D 70/142; Y02D 70/1224; Y02D 70/1242; Y02D 70/1262; Y02D 70/00
See application file for complete search history.

(56) References Cited

U.S. PATENT DOCUMENTS

| | | | | |
|---|---|---|---|---|
| 2009/0258607 | A1* | 10/2009 | Beninghaus | ......... H04B 1/3805 455/77 |
| 2012/0328061 | A1* | 12/2012 | Chow | ............... H04W 56/0015 375/354 |

(Continued)

*Primary Examiner* — Lan-Huong Troung

(57) ABSTRACT

Disclosed herein are techniques to enable discovery of a NAN cluster using low-power communication. According to such techniques, a NAN discovery beacon including information indicative of a schedule for communication using a first radio is transmitted using a second radio that utilizes a lower amount of power relative to the first radio.

25 Claims, 8 Drawing Sheets

Related U.S. Application Data

(60) Provisional application No. 61/987,994, filed on May 2, 2014.

(51) Int. Cl.
*H04W 8/00* (2009.01)
*H04W 72/12* (2009.01)
*H04W 48/12* (2009.01)
H04W 84/18 (2009.01)
H04W 92/18 (2009.01)

(52) U.S. Cl.
CPC .......... *Y02D 70/144* (2018.01); *Y02D 70/146* (2018.01); *Y02D 70/162* (2018.01)

(56) References Cited

U.S. PATENT DOCUMENTS

| | | | | |
|---|---|---|---|---|
| 2013/0329821 A1* | 12/2013 | Chen | ................ | H04L 5/0064 |
| | | | | 375/267 |
| 2014/0141826 A1* | 5/2014 | Cordeiro | ............ | H04W 48/14 |
| | | | | 455/509 |
| 2014/0281623 A1* | 9/2014 | Zhang | ............... | G06F 1/3234 |
| | | | | 713/323 |
| 2014/0293982 A1* | 10/2014 | Gupta | ................ | H04W 48/16 |
| | | | | 370/338 |
| 2015/0071121 A1* | 3/2015 | Patil | ................ | H04W 40/24 |
| | | | | 370/255 |
| 2015/0200811 A1* | 7/2015 | Kasslin | ............... | H04L 41/12 |
| | | | | 370/254 |
| 2015/0256992 A1* | 9/2015 | Kelleman | ............ | H04W 8/005 |
| | | | | 370/254 |
| 2015/0316029 A1* | 11/2015 | Altmikus | ............ | F03D 1/0633 |
| | | | | 416/228 |

* cited by examiner

| Cluster Attributes 311 | Cluster ID 312 | OUI 313 | OUI Type 314 | NAN Capability 315 |
|---|---|---|---|---|

Discovery Beacon 310

*FIG. 2*

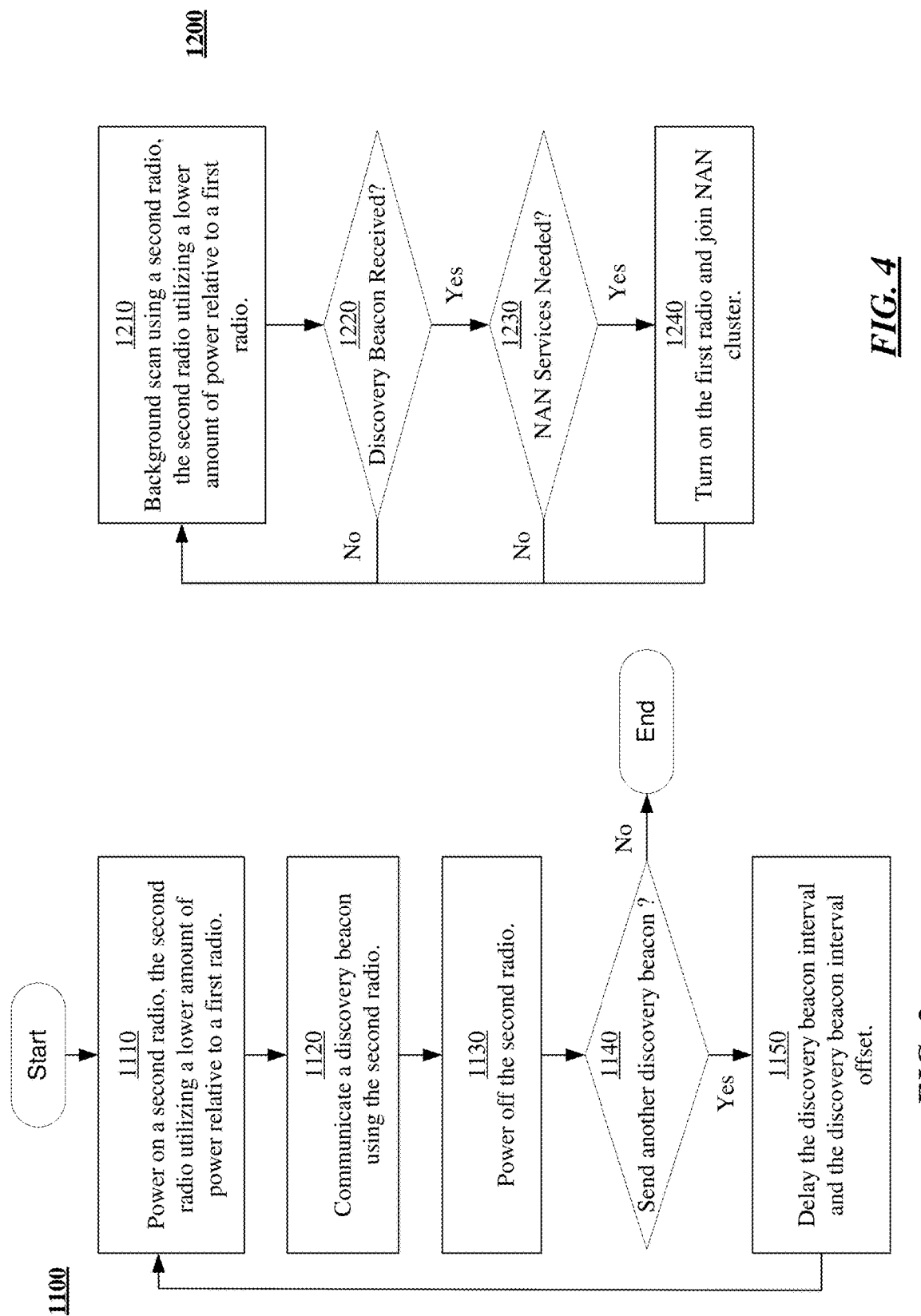

FIG. 7
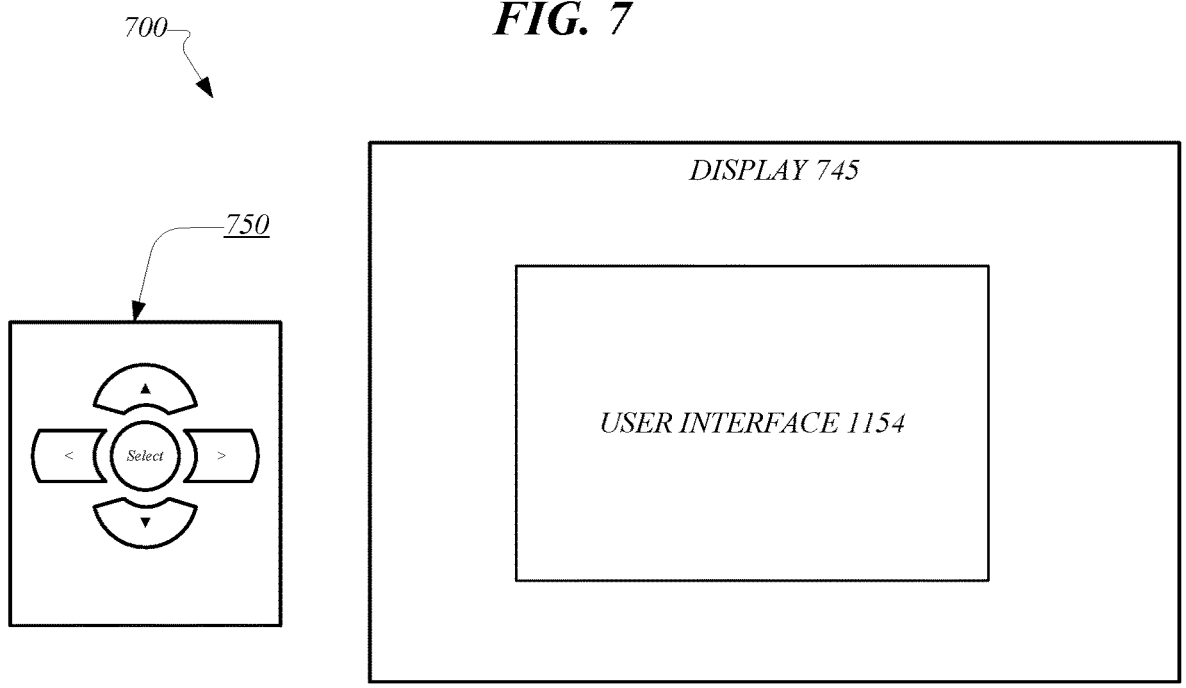
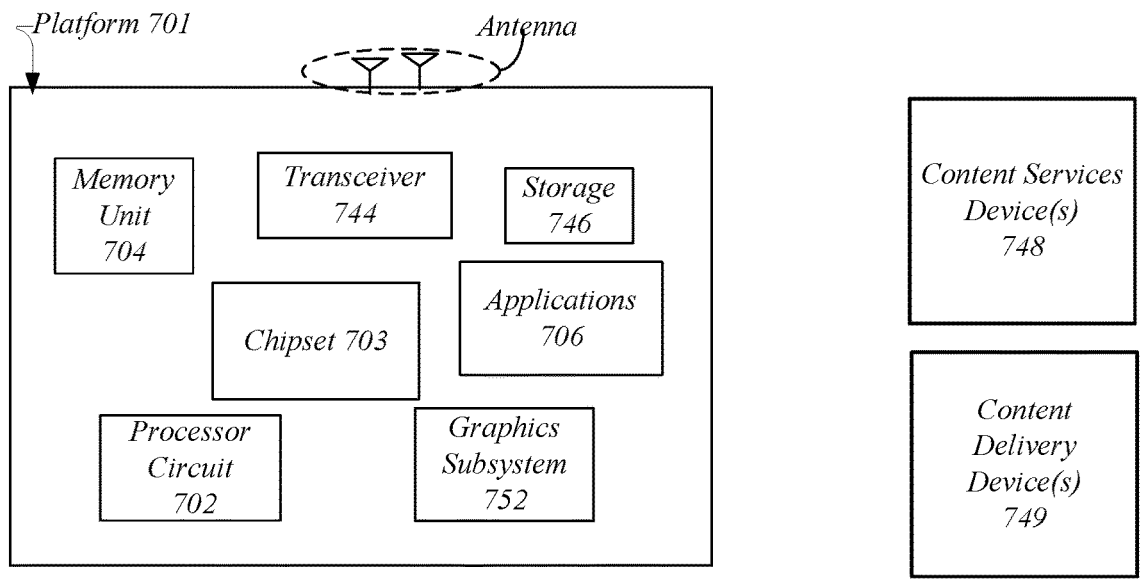
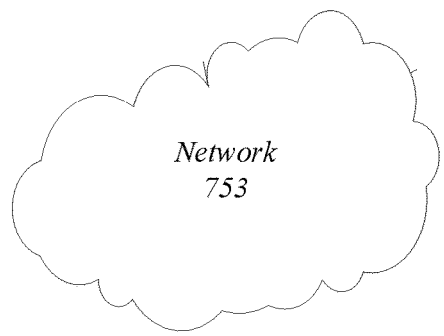

BLUETOOTH ASSISTED NAN CLUSTER DISCOVERY

RELATED CASES

This application is a continuation of, claims the benefit of, and claims priority to U.S. patent application Ser. No. 14/318,463 filed Jun. 27, 2014, which in turn claims priority to U.S. Provisional Application Ser. No. 61/987,994 filed May 2, 2014. The subject matter of said U.S. patent application and U.S. provisional patent application are incorporated herein by reference in their entireties.

TECHNICAL FIELD

Embodiments described herein generally relate to wireless communications and in particular to network discovery.

BACKGROUND

Many modern devices include networking capabilities. In particular, many devices include Wi-Fi capabilities. The Wi-Fi Alliance (WFA) has developed a protocol referred to as Neighbor Aware Networking (NAN). NAN facilitates device-to-device service discovery among various Wi-Fi enabled devices. In general, NAN allows multiple Wi-Fi devices to be synchronized. In particular, the devices can form a cluster of devices, wake up at the same time period (referred to as the discovery window), and communicate during the discovery window.

To facilitate device discovery, the NAN protocol provides that one of the devices in the cluster will be designated as the "master" device. The master device repeatedly (e.g., every 100 ms, or the like) broadcasts a discovery beacon. Another device can then receive the discovery beacon (e.g., by performing a background scan, or the like) to detect and join the cluster.

However, this technique provides a tradeoff in that the frequency of the background scan is proportional to the amount of power consumed. Said differently, cluster discovery latency is proportional to power consumption, with lower latency corresponding to greater power consumption. As an example, if cluster discovery is desired within 5 s, then power consumption will be approximately 3.7 mW. More specifically, assuming current draw in idle mode for a Wi-Fi device is approximately 35 mA with 3.6V, then power consumption can be derived as (A*V/Y), wherein A is the approximate current draw, V is the voltage amplitude, and Y is the latency. As such, power consumption for the above described system is approximately 35 mA*3.6V/5 s=3.7 mW.

As will be appreciated, performing background scans to detect NAN clusters as described above can drain a significant amount of power. In particular, for mobile devices, a repeated draw of this much power could quickly reduce the available power levels (e.g., the battery level, or the like) of the device. Accordingly, lower power detection of NAN clusters is desired. In some implementations, a power draw of less than 1 mW may be desirable. However, in order to have power consumption be less than 1 mW under the above-assumed conditions, latency will need to increase to at least 19 s. This may be unacceptable for certain applications.

Accordingly, the present disclosure is directed to reducing power consumption for NAN cluster discovery. In particular, the present disclosure is directed to reducing power consumption for NAN cluster discovery without sacrificing discovery latency.

BRIEF DESCRIPTION OF THE DRAWINGS

FIG. 2 illustrates one embodiment of a discovery beacon frame.

FIGS. 3-4 illustrate logic flows for embodiments of NAN cluster discovery and communication.

FIG. 7 illustrates one embodiment of a storage medium.

DETAILED DESCRIPTION

Figure 1:
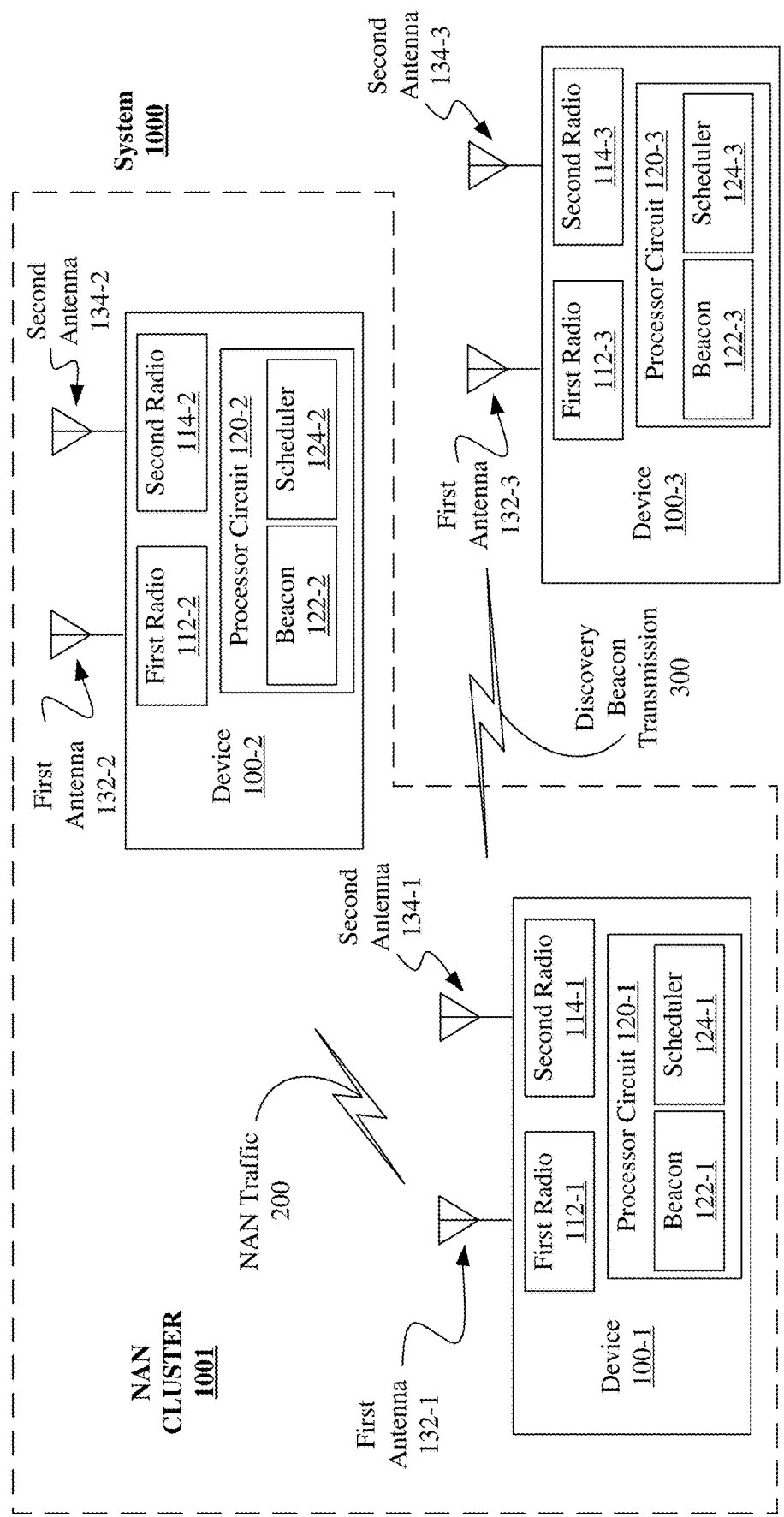
FIG. 1 illustrates one embodiment of an NAN cluster and associated wireless devices.

Examples disclosed herein generally directed to systems and techniques to reduce power consumption for Neighbor Aware Networking (NAN) (sometimes referred to as neighbor aware network, neighborhood-aware networking, or network aware networking) cluster discovery. Said differently, the present disclosure provides various examples of reducing power consumption for devices during discovery of a NAN cluster. In particular, according to some examples, a discovery beacon including scheduling information for a NAN cluster may be communicated using a radio (e.g., Bluetooth (BT), or the like) that utilizes lower power relative to the radio used for NAN cluster communication. Accordingly, a master device in the NAN cluster may repeatedly communicate a frame having discovery beacon information using its lower power radio. Similarly, another device (e.g., one desiring to discover a NAN cluster) may perform a background scan using its lower power radio to receive the discovery beacon.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Reference is made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives within the scope of the claims.

FIG. 1 illustrates a system 1000 and associated devices 100-*a*, where "a" is a positive integer. It is noted, that a number of associated devices 100-*a* are shown. In particular, devices 100-1, 100-2, and 100-3 are shown. However, it is to be appreciated, that any number of devices 100-*a* may be implemented, and the number of devices depicted is merely shown at a quantity to facilitate understanding.

Each of the devices 100-*a* includes a first radio 112-*a* and a second radio 114-*a*. In general, one of the radios (e.g., the second radio 114-*a*) may utilize a lower amount of power relative to the other radio (e.g., the first radio 112-*a*). For example, in some embodiments, the first radio 112-*a* may be a Wi-Fi radio, while the second radio may be a Bluetooth (BT) radio. In a particular example, current draw in idle mode for the first radio 112-*a* may be greater than 30 mA while current draw in idle mode for the second radio 114-*a* may be less than 30 mA. In some examples, the first radio may utilize approximately 36 mA of current while the second radio may utilize approximately 21.6 mA of current. It is to be appreciated, that the current amounts provided herein are given for example only and are not intended to be limiting.

Furthermore, each of the devices 100-*a* includes a first antenna (or antenna array) 132-*a* and a second antenna (or antenna array) 134-*a*. The first and second antennas 132-*a* and 134-*a* are operably connected to the first and second radios 112-*a* and 114-*a*, respectively. Additionally, it is to be appreciated, that although not depicted, one of the devices 100-*a* may be provided with a single antenna (or antenna array) operably connected to both the first and second radios 112-*a* and 114-*a*.

In the system 1000, a NAN cluster 1001 is depicted including ones of the devices 100-*a*. In particular, the NAN cluster 1001 is depicted including devices 100-1 and 100-2. As will be appreciated, in a NAN cluster, each device repeatedly (e.g., at a fixed period, or the like) turns on its first radio 112-*a* for a synchronized period, referred to as the "discovery window." Accordingly, devices 100-*a* in the NAN cluster 1001 can connect in a "peer-to-peer" fashion during the discovery window. In particular, during the discovery window, the devices within the NAN cluster 1001 may communicate with each other over the network 200, by for example, communicating data (e.g., NAN traffic, or the like) using the first radios 112-*a*.

Additionally, each of the devices 100-*a* includes a processor circuit 120-*a* operably coupled to the first and second radios 112-*a* and 114-*a*. In some examples, the processor circuit 120-*a* may be an application processor of the device 100-*a*. In some examples, the processor circuit 120-*a* may be a baseband processor of the device 100-*a*. Each of the devices 100-*a* may also include a beacon component 122-*a* (referred to as "beacon 122-*a*" in the figures) and a scheduling component 124-*a* (referred to as "scheduler 124-*a*" in the figures). The beacon component 122-*a* and the scheduling component 124-*a* may comprise programming, functions, logic, parameters, and/or other information operative to implement particular capabilities for the devices 100-*a*. In some examples, the components 122-*a* and 124-*a* may be executable by the processing circuit 120-*a*.

In a NAN cluster, one device is designated as the "cluster master". In FIG. 1, the device 100-1 is depicted as the cluster master within the NAN cluster 1001. However, it is to be appreciated, that the cluster master could be any device 100-*a* in the NAN cluster 1001. The scheduling component 124-1 of the cluster mater 100-1 determines a schedule for communication using the first radio 112-1. In particular, the scheduling component determines information related to the discovery window for communication in the NAN 1001.

The beacon component 122-1 of the cluster master 100-1 generates a discovery beacon (e.g., refer to FIG. 2) to be communicated by the second radio 114-1, the discovery beacon to include an indication of the schedule for communication during the discovery window. Furthermore, the beacon component 122-1 causes the second radio 114-1 to repeatedly communicate the discovery beacon to facilitate other devices (e.g., the device 100-3) discovering and joining the NAN cluster 1001. For example, the beacon component 122-2 may repeatedly (e.g., periodically, every 100 ms, or the like) cause the second radio 114-1 to communicate a discovery beacon. This is depicted in the figures as the discovery beacon transmission 300.

A device desiring to discover and/or join the NAN cluster 1001 may repeatedly (e.g. periodically, every 100 ms, or the like) perform a background scan to detect the discovery beacon transmission 300. For example, the beacon component 122-3 of the device 100-3 may cause the second radio 114-3 to repeatedly perform a background scan to receive the discovery beacon transmission 300. The device 100-3 may then join the NAN cluster 1001 based on information within the discovery beacon. More specifically, the scheduling component 124-3 of the device 100-3 may determine the discovery window for the NAN 1001 based on the scheduling information included in the discovery beacon. As described in greater detail below (e.g., refer to FIG. 2) the discovery beacon includes information corresponding to the NAN cluster 1001. In particular, the discovery beacon includes scheduling information related to the discovery window (e.g., timing, radio frequency, offset, or the like) of the NAN cluster 1001. As such, the device 100-3 may turn off its second radio 114-3 and configure its first radio 112-3 to communicate during the discovery window specified in the discovery beacon to communicate (e.g., broadcast and/or access NAN services) with devices (e.g., the device 100-1 and/or the device 100-2) in the NAN cluster 1001.

FIG. 2 illustrates an example discovery beacon 310, which may be communicated by the cluster master (e.g., the device 100-1) of the NAN cluster 1001. In some examples, the discovery beacon 310 may be a BT frame communicated over BT frequencies. As depicted, the discovery beacon 310 includes a cluster attributes field 311, a cluster identifier (ID) field 312, an organizationally unique identifier (OUI) field 313, an OUI type field 314, and a NAN capabilities field 315. It is to be appreciated, that in some examples, the fields of the discovery beacon may be contiguously located in the frame.

In some examples, the cluster attributes field 311 includes indications of information related to the NAN cluster 1001. The cluster ID field 312 includes a unique identifier, which can be used to differentiate between different NAN clusters. For example, as will be appreciated, multiple NAN clusters may be organized within range of each other. As such, discovery beacons for each NAN cluster may be received by one device. The cluster ID field 312 may be used to distinguish between these adjacent NAN clusters.

In some examples, the NAN cluster 1001 may be organized according to various standards and/or specifications, such as, for example, the Wi-Fi Alliance (WFA) Neighbor Aware Networking (NAN) protocol. The WFA NAN protocol specifies an OUI for each NAN cluster. As such, the OUI field 313 may correspond to the WFA NAN protocol specified OUI. Likewise the OUI type field 314 may include indications of the type and/or version of the NAN cluster. The NAN capability field 315 may include an indication of whether the device supports NAN.

FIGS. 3-4 illustrate examples of logic flows representative of at least some operations executed by one or more logic, features, or devices described herein. In general, the logic flows may be representative of some of all of the operations executed by logic and/or features of the devices 100-a of the system 1000. In particular, FIG. 3 may be representative of operations performed by the device 100-1 in acting as the cluster master for the NAN cluster 1001 while FIG. 4 may be representative of operations performed by the device 100-3 in discovering the NAN cluster 1001. It is to be appreciated, that although the example logic flows are described with reference to the system 1000 of FIGS. 1-2, examples are not limited in this context.

Turning more specifically to FIG. 3, a logic flow 1100 is depicted. The logic flow 1100 may begin at block 1110. At block 1110, "power on a second radio utilizing a lower amount of power relative to a first radio" the device 100-1 may power on the second radio 114-1. In particular, the beacon component 122-1 may send a control directive to power on the second radio 114-1. Continuing to block 1120, "communicate a discovery beacon using the second radio" the device 100-1 may communicate the discovery beacon 310 using the second radio 114-1. In particular, the beacon component 122-1 may communicate the discovery beacon 310 using the second radio 114-1. Continuing to block 1130 "power off the second radio" the device 100-1 may power off the second radio 114-1. In particular, the beacon component 122-1 may send a control directive to power off the second radio 114-1

Continuing to block 1140, "send another discovery beacon?" the device 100-1 may determine whether to send another discovery beacon. In particular, the beacon component 122-1 may determine whether to repeatedly send the discovery beacon 310. From block 1140, the logic flow 1100 may either end or continuing to block 1150, "delay a discovery beacon interval and a discovery beacon interval offset" the device 100-1 may delay a period (e.g., corresponding to the discovery beacon interval and the discovery beacon interval offset) before returning to block 1110. In particular, the beacon component 122-1 may cause the device 110-1 to delay (e.g., refer to FIG. 6) before repeating the transmission of the discovery beacon 310.

Turning more specifically to FIG. 4, a logic flow 1200 is depicted. The logic flow 1200 may begin at block 1210. At block 1210, "background scan with a second radio utilizing a lower amount of power relative to a first radio" the device 100-3 may perform a background scan using the second radio 114-3. In particular, the beacon component 122-3 may cause the device 100-3 to perform the background scan. In some examples, this may include sending a control directive to power on the second radio 114-3. Furthermore, in some examples, the beacon component 122-3 may cause the background scan to last for a certain time (e.g., the background scan interval, or the like). In some examples, the background scan interval can be based on a desired latency for connecting to a NAN. In particular, a device may have a desired latency to support particular applications or implementations. This desired latency could correspond to the background scan interval. As such, in practice, a NAN cluster may be discovered within the period desired to support the applications or implementations of the device. In some examples, during block 1210, the beacon component 122-3 may cause the first radio (e.g., the Wi-Fi radio, or the like) to be powered off. In particular, the beacon component may send a control directive to power off the first radio 112-1.

Continuing to block 1220, "discovery beacon received?" the device 100-3 may determine whether a discovery beacon 310 was received during the background scan interval. In particular, the scheduling component 124-3 may determine whether the discovery beacon 310 was received. The logic flow 1200 may return to block 1210 based on a determination that the discovery beacon 310 was not received. Continuing to block 1230, "NAN services needed?" the device 100-3 may determine whether any of the NAN services (broadcasting and/or accessing services over the NAN) are needed. In particular, the scheduling component 124-3 may determine whether any of the services available on the NAN 1001 are needed. For example, the discovery beacon 310 may include a specification or definition of the services available on the NAN 1001. As such, the scheduling component 124-3 may determine if any of the specified services are desired. The logic flow 1200 may return to block 1210 based on a determination that services on the NAN are not needed and/or desired.

Conversely, the logic flow 1200 may continue to block 1240 based on a determination that services on the NAN are needed. For example, if a device receives the discovery beacon communicated by a NAN cluster master during background scanning (e.g., at block 1210) and the device needs to advertise or discover services, then the device may continue to block 1240. At block 1240, "turn on first radio and join NAN cluster" the device 100-3 may turn on the first radio 112-3 and join the NAN cluster 1001. For example, the scheduling component 124-3 may turn on the first radio 112-3 and join the NAN 1001 (e.g., scan or broadcast during the discovery window as specified in the discovery beacon). Additionally, in some examples, at block 1240, the scheduling component 124-3 may turn off the second radio 114-3.

In some examples, the second radio 114-3 may be left on to continue to perform background scanning. For example, the beacon component 122-3 may continue background scanning using the second radio 114-3 to discover other clusters, perform cluster merging, or the like. With some examples, the device 100-a may only continue background scanning once joining a NAN cluster if the device 100-a is designated as a cluster master. In such a scenario, the device 100-a may continue background scanning and, upon discovering another NAN cluster broadcast information to cause the other devices in the NAN cluster to merge with the newly discovered NAN cluster.

In some examples, the discovery beacon interval may be increased (e.g., by 3-10×, or the like) once a device joins a NAN. For example, the beacon component 122-3 may cause the device 100-3 to continue background scanning after joining the NAN cluster 1001, just with a longer discovery beacon interval.

Figure 5:
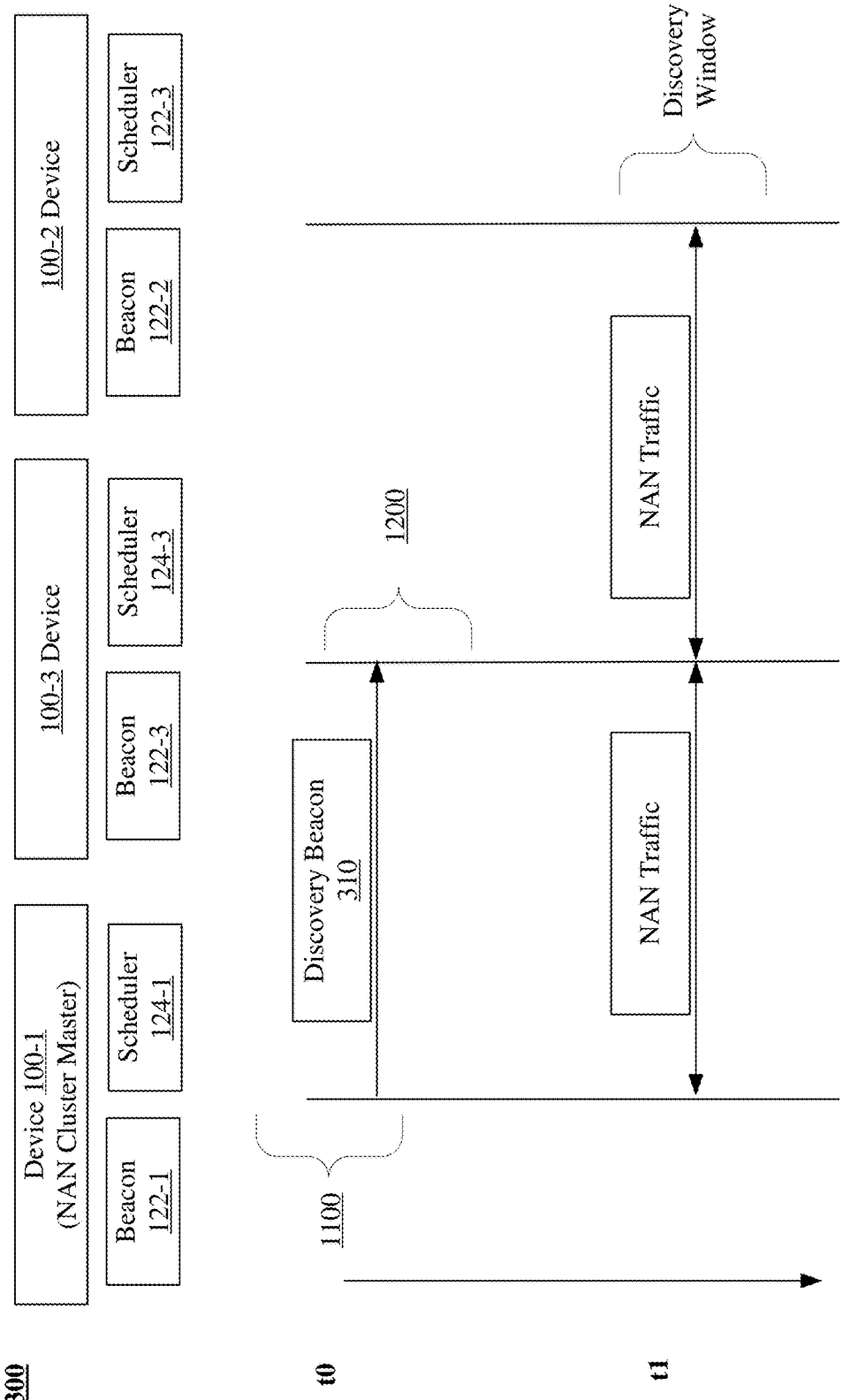
FIG. 5 illustrates one embodiment of a NAN discovery and communication technique.
Figure 6:
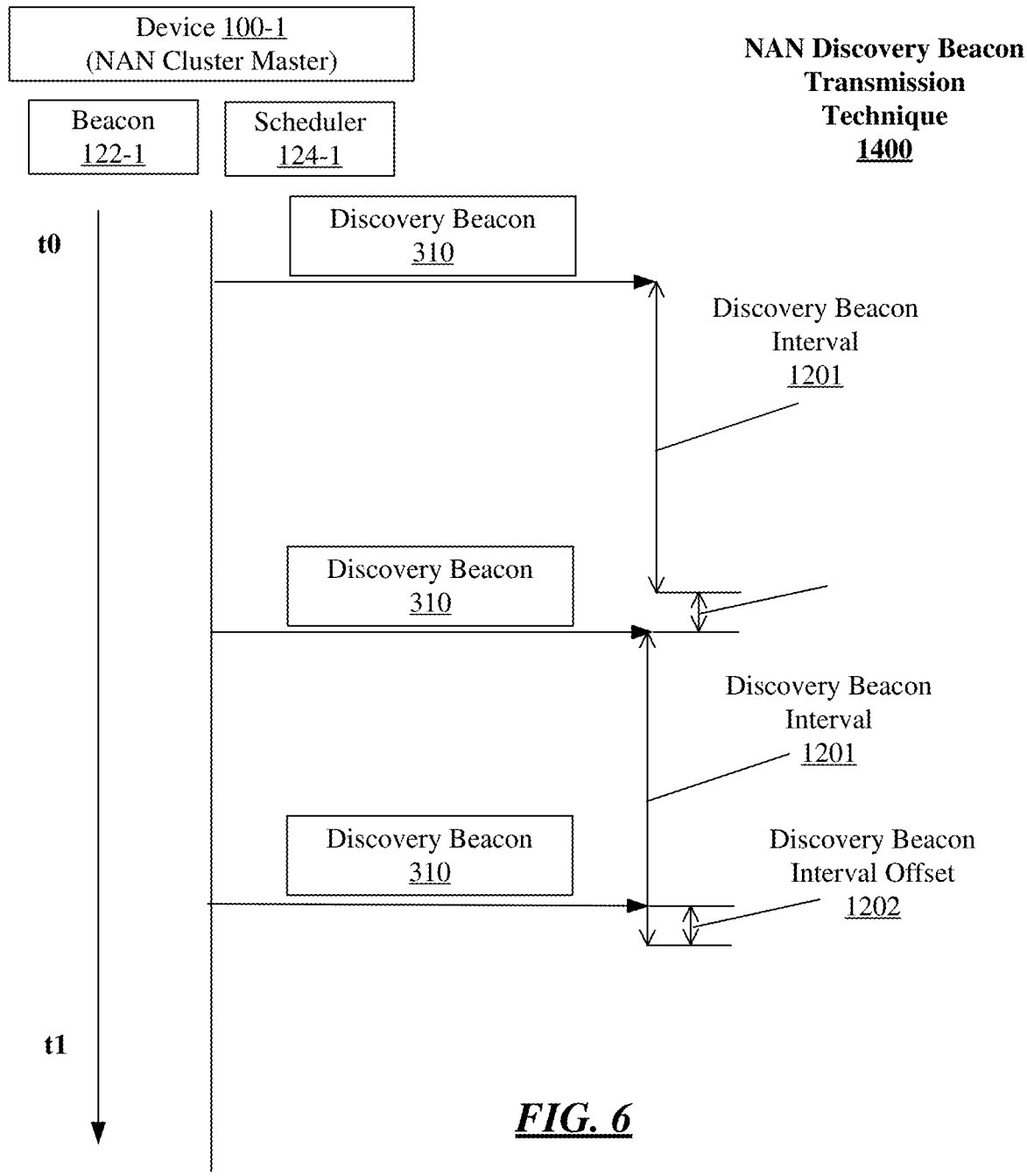
FIG. 6 illustrates one embodiment of a NAN discovery beacon transmission technique.

FIGS. 5-6 illustrate examples of NAN discovery and communication techniques. In general, the depicted techniques illustrate operations that may be implemented in the system 1000. In particular, FIG. 5 illustrates an example NAN discovery and communication technique 1100 implemented by devices to facilitate NAN discovery and NAN communication while FIG. 6 illustrates an example of a NAN discovery technique. Although the depicted techniques are described with reference to the system 1000 of FIGS. 1-2 and the logic flow operations FIGS. 4-5, examples are not limited in this context.

Turning more specifically to FIG. 5, the technique 1300 is depicted. In the technique 1300, communications are exchanged between a NAN cluster master (e.g., the device 100-1) and other devices (e.g., the device 100-2 and the device 100-3). In general, the NAN cluster master 100-1 communicates a discover beacon which may be received by a device (e.g., the device 100-3) desiring to identify and/or join the NAN cluster 1001. In particular, the beacon component 122-1 may cause the discovery beacon 310 to be using the second radio 114-1, such as, for example as described above with respect to the logic flow 1100.

Additionally, discovery beacon 122-3 may cause the device 100-3 to receive the discovery beacon 310 by background scanning using the second radio 114-3, such as, for example, as described above with respect to the logic flow 1200. For example, beacon component 122-3 may cause a background scan to take place using the second radio 114-3 of the device 100-3 to scan for the discovery beacon 310 communicated by the device 100-1. As noted above, the duration of the background scan or the period of the background scan may depend upon the desired latency for connecting to a NAN. For example, some applications and/or devices may require that a NAN connection be established quickly (e.g., within 1-5 seconds) to provide a suitable quality of service. Accordingly, the period for initiating a background scan could corresponds to this desire latency.

Furthermore, as noted above, with some example, the second radio 114-a may be a BT radio, while the first radio 112-a may be a Wi-Fi radio. As will be appreciated, using a BT radio to communicate the discovery beacon 310 is more power efficient than using a Wi-Fi radio.

For example, assume that the size of the discovery beacon 310 includes: the cluster attribute field 311 (16 bytes), the cluster ID field 312 (6 bytes), the OUI field 313 (3 bytes), the OUI type field 314 (1 byte), and the NAN capability field 315 (1 byte). Furthermore, assume the data rate of BT is 1 Mbps, and transmission duration of the beacon 310 under BT is 216 us. Since BT uses three channels to communicate, the total duration per Z=100 ms is 648 us. Additionally, assume that current draw of a BT radio (e.g., the second radio 114-a) under transmission is around 21.6 mA. Accordingly, the power consumption for the NAN cluster master 100-1 is 0.000648*21.6*3.6/0.1=0.5 mW, where 3.6 represents the value of voltage.

On the other hand, Wi-Fi has a higher data rate (e.g., 6 Mpbs) and also has higher overhead. Accordingly, for a discovery beacon communicated over Wi-Fi, the duration of discovery beacon transmission is only 113 us. Additionally, assume that current draw for a Wi-Fi transmission is around 180 mA. The power consumption for a discovery beacon communicated over Wi-Fi is then 0.000113*180*3.6/0.1=0.7 mW, where 3.6 represents the value of voltage.

Hence, where the second radio 114-a is a BT radio and the first radio 112-a is a Wi-Fi radio, the present disclosure reduces the power consumption for communicating the required information in the discovery beacons by a factor of 1.4 versus conventional techniques.

Given the information contained in the discovery beacon 310, the device 100-3 can join the NAN 1001. Additionally, using information obtained from the discovery beacon 310, devices in the NAN cluster 1001 (e.g., 100-1, 100-2, and/or 100-3) can turn on their first radios 112-a during the discovery window to broadcast and/or access NAN services. In particular, each scheduling component 124-a of the devices 100-a may repeatedly turn on the corresponding first radios 112-a during the discovery window to broadcast and/or access NAN services on the NAN cluster 1001.

Turning more specifically to FIG. 4, the discovery beacon transmission technique 1400 is depicted. In general, the technique 1400 is representative of a NAN discovery beacon broadcasting procedure during which a discovery beacon is repeatedly broadcast over a low-power channel, such as, for example BT.

As will be appreciated, some transmission schemes (e.g., BT) do not include any native collision avoidance techniques. Accordingly, in a scenario where multiple NAN masters exist (e.g., within the same cluster, within different clusters in the same range, or the like), each NAN master may communicate a discovery beacon. The discovery beacons could potentially be communicated at the same time, thereby causing collision problems. Accordingly, the present disclosure provides that a NAN master may repeatedly communicate the discovery beacon 310 on a fixed discovery beacon interval 1401+/-a discovery beacon interval offset 1402. More specifically, the NAN cluster master 100-1 may communicate the discovery beacon 310 in a discovery beacon window where the discovery beacon window includes the discovery beacon interval 1401 plus the discovery beacon interval offset 1402.

The beacon component 122-1 (e.g., at blocks 1110 and 1120) can periodically turn on the second radio 114-1 and communicate the discovery beacon 310. Subsequently, the beacon component 122-1 may cause the second radio 114-1 to be powered off, and then cause a delay (e.g., corresponding to the discovery beacon interval and the discovery beacon interval offset) to occur prior to again turning on the second radio 114-1 and communicating the beacon 310.

As noted above, the discovery beacon interval 1201 can be implementation dependent. Furthermore, the discovery beacon interval offset 1202 may be randomly generated to provide that the discovery beacon intervals for adjacent NAN cluster masters do not overlap. In some examples, the beacon component 122-1 may randomly generate the discovery beacon interval offset 1202. In further examples, the beacon 122-1 may randomly generate the discovery beacon interval offset each time the discovery beacon 310 is communicated. With some examples, the discovery beacon interval offset may be less than or equal to 10% of the discovery beacon interval 1201.

FIG. 7 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement logic flow 1100. In some examples, the storage medium 2000 may store various types of computer executable instructions to implement logic flow 1200. In some examples, the storage medium 2000 may store various types of computer executable instructions to implement logic flow 1300. In some examples, the storage medium 2000 may store various types of computer executable instructions to implement logic flow 1400.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
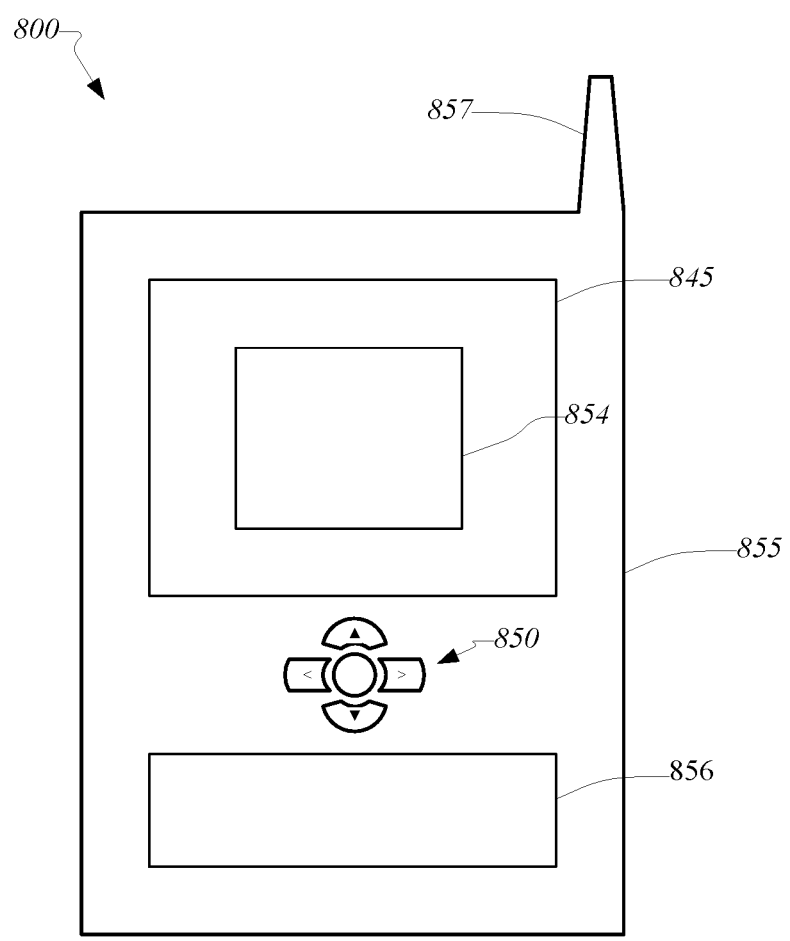
FIG. 8 illustrates one embodiment of a device.

FIG. 8 illustrates an embodiment of a device 3000. In some examples, device 3000 may be configured or arranged for wireless communications in a NAN cluster such as the NAN cluster 1000 shown in FIG. 1. In some examples, one of the devices 100-a may be implemented in the device 3000. For example, the device 3000 may implement the device as apparatus 100-a. Additionally, the device 3000 may implement storage medium 2000 and/or a logic circuit 1100/1200/1300/1400. The logic circuits may include physical circuits to perform operations described for the apparatus 100-a, storage medium 2000, logic flow 1100, logic flow 1200, logic flow 1300, and/or logic flow 1400. As shown in FIG. 7, device 3000 may include a radio interface 3110, baseband circuitry 3120, and computing platform 3130, although examples are not limited to this configuration.

The device 3000 may implement some or all of the structure and/or operations for the apparatus 100-a, the storage medium 2000 and/or the logic circuit 1100/1200/1300/1400 in a single computing entity, such as entirely within a single device. The embodiments are not limited in this context.

Radio interface 3110 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM symbols) although the embodiments are not limited to any specific over-the-air interface or modulation scheme. Radio interface 3110 may include, for example, a receiver 3112, a transmitter 3116 and/or a frequency synthesizer 3114. Radio interface 3110 may include bias controls, a crystal oscillator and antennas 3118-1 to 3118-f. In another embodiment, radio interface 3110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 3120 may communicate with radio interface 3110 to process receive and/or transmit signals and may include, for example, an analog-to-digital converter 3122 for down converting received signals, a digital-to-analog converter 3124 for up converting signals for transmission. Further, baseband circuitry 3120 may include a baseband or physical layer (PHY) processing circuit 3126 for PHY link layer processing of respective receive/transmit signals. Baseband circuitry 3120 may include, for example, a processing circuit 3128 for medium access control (MAC)/data link layer processing. Baseband circuitry 3120 may include a memory controller 3132 for communicating with MAC processing circuit 3128 and/or a computing platform 3130, for example, via one or more interfaces 3134.

In some embodiments, PHY processing circuit 3126 may include a frame construction and/or detection module, in combination with additional circuitry such as a buffer memory, to construct and/or deconstruct communication frames (e.g., containing subframes). Alternatively or in addition, MAC processing circuit 3128 may share processing for certain of these functions or perform these processes independent of PHY processing circuit 3126. In some embodiments, MAC and PHY processing may be integrated into a single circuit.

Computing platform 3130 may provide computing functionality for device 3000. As shown, computing platform 3130 may include a processing component 3140. In addition to, or alternatively of, baseband circuitry 3120 of device 3000 may execute processing operations or logic for the apparatus 100a, storage medium 2000, and logic circuits 1100/1200/1300/1400 using the processing component 3130. Processing component 3140 (and/or PHY 3126 and/or MAC 3128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 3130 may further include other platform components 3150. Other platform components 3150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 3130 may further include a network interface 3160. In some examples, network interface 3160 may include logic and/or features to support network interfaces operated in compliance with one or more wireless broadband technologies such as those described in one or more standards associated with IEEE 802.11 such as IEEE 802.11u or with technical specification such as WFA Hotspot 2.0.

Device 3000 may be part of a source or destination node in a MIMO system and may be included in various types of computing devices to include, but not limited to, user equipment, a computer, a personal computer (PC), a desktop computer, a laptop computer, a notebook computer, a net-book computer, a tablet computer, an ultra-book computer, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of device 2000 described herein; may be included or omitted in various embodiments of device 2000, as suitably desired. In some embodiments, device 2000 may be configured to be compatible with protocols and frequencies associated with IEEE 802.11 Standards or Specification and/or 3GPP Standards or Specifications for MIMO systems, although the examples are not limited in this respect.

The components and features of device 3000 may be implemented using any combination of discrete circuitry, application specific integrated circuits (ASICs), logic gates and/or single chip architectures. Further, the features of device 3000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 3000 shown in the block diagram of FIG. 7 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 9:
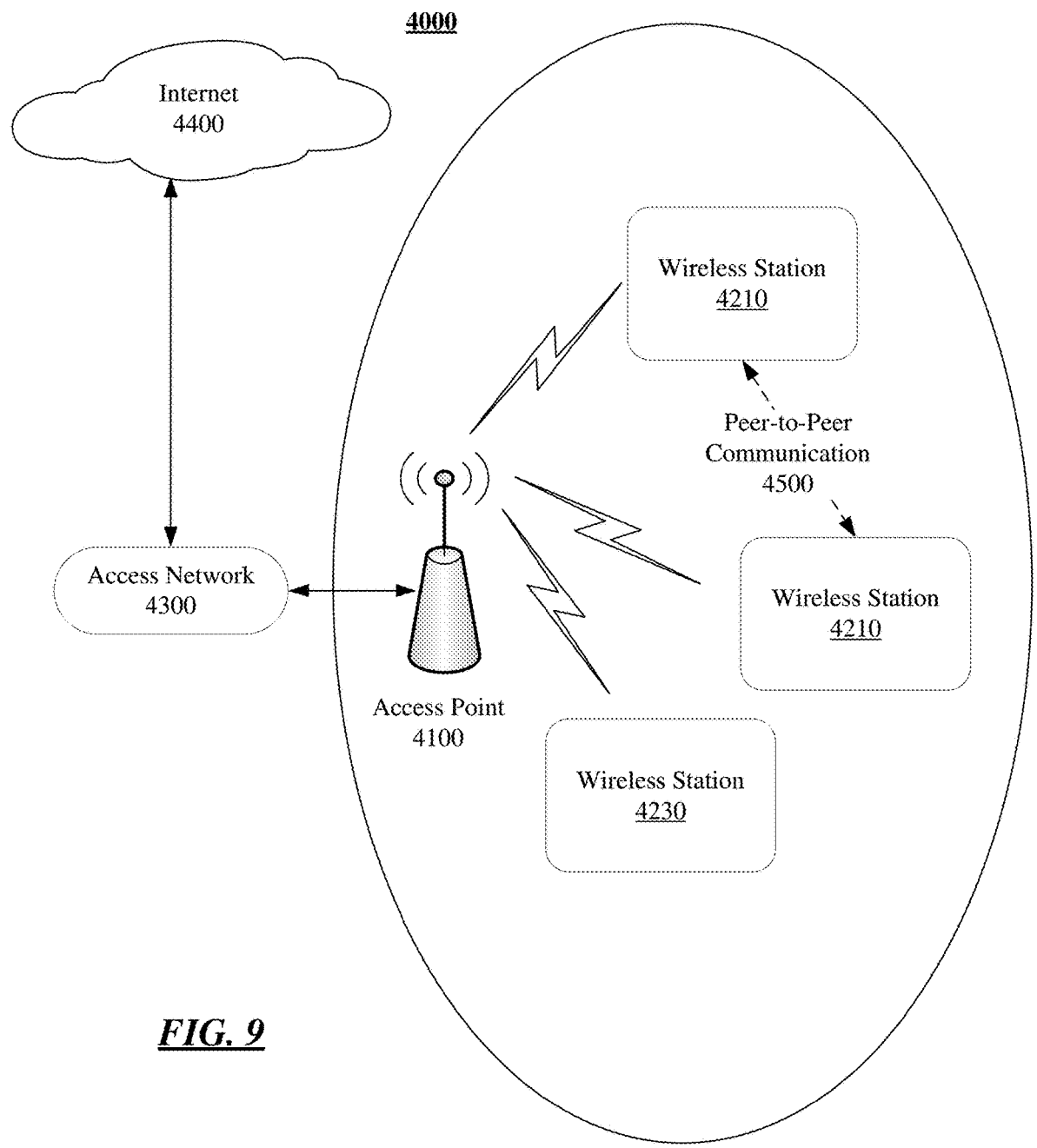
FIG. 9 illustrates one embodiment of a wireless network.

FIG. 9 illustrates an embodiment of a wireless network 4000, which may be implemented to provide NAN discovery as described herein. In particular, the system 1000 may be implemented in a network such as the network 4000. As depicted, wireless network 4000 comprises an access point 4100 and wireless stations 4210, 4220, and 4230. In various embodiments, wireless network 4000 may comprise a wireless local area network (WLAN), such as a WLAN implementing one or more Institute of Electrical and Electronics Engineers (IEEE) 802.11 standards (sometimes collectively referred to as "Wi-Fi"). In some other embodiments, wireless network 4000 may comprise another type of wireless network, and/or may implement other wireless communications standards. In various embodiments, for example, wireless network 4000 may comprise a WWAN or WPAN rather than a WLAN. The embodiments are not limited to this example.

In some embodiments, wireless network 4000 may implement one or more broadband wireless communications standards, such as 3G or 4G standards, including their revisions, progeny, and variants. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1×RTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), Bluetooth (BT), ANT, ZigBee, and so forth. The embodiments are not limited in this context.

In various embodiments, wireless stations 4210, 4220, and 4230 may communicate with access point 4100 in order to obtain connectivity to one or more external data networks. In some embodiments, for example, wireless stations 4210, 4220, and 4230 may connect to the Internet 4400 via access point 4100 and access network 4300. In various embodiments, access network 4300 may comprise a private network that provides subscription-based Internet-connectivity, such as an Internet Service Provider (ISP) network. The embodiments are not limited to this example.

In various embodiments, two or more of wireless stations 4210, 4220, and 4230 may communicate with each other directly by exchanging peer-to-peer communications. For example, as depicted in FIG. 9, wireless stations 4210 and 4220 communicate with each other directly by exchanging peer-to-peer communications 4500. In some embodiments, such peer-to-peer communications may be performed according to one or more Wi-Fi Alliance (WFA) standards. For example, in various embodiments, such peer-to-peer communications may be performed according to the WFA Wi-Fi Direct standard, 2010 Release. In various embodiments, such peer-to-peer communications may additionally or alternatively be performed using one or more interfaces, protocols, and/or standards developed by the WFA Wi-Fi Direct Services (WFDS) Task Group. In various embodiments, such peer-to-peer communications may be performed according to the MFA NAN protocol. The embodiments are not limited to these examples.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose might be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Example 1

An apparatus for a device in a wireless network, the apparatus including circuitry; a scheduling component executable by the circuitry, the scheduling component to determine a schedule for communication using a first radio; and a beacon component executable by the circuitry, the beacon component to generate a discovery beacon for communication using a second radio, the discovery beacon to include an indication of the schedule.

Example 2

The apparatus of example 1, further including the first radio operably connected to the circuitry; and the second radio operably connected to the circuitry, the second radio to utilize a lower amount of power relative to the first radio.

Example 3

The apparatus of example 1, further including the second radio operably connected to the circuitry, the beacon component to send a control directive to power on the second radio in order to communicate the discovery beacon.

Example 4

The apparatus of any one of examples 2 to 3, the beacon component to repeatedly power on the second radio to repeatedly communicate the discovery beacon.

Example 5

The apparatus of any one of examples 3 to 4, the second radio to comprise a Bluetooth radio.

Example 6

The apparatus of any one of examples 1 to 2, the first radio to comprise a Wi-Fi radio.

Example 7

The apparatus of any one of examples 1 to 3, the beacon component to communicate the discovery beacon in a discovery beacon window.

Example 8

The apparatus of example 7, the discovery beacon window to comprise a discovery beacon interval and a discovery beacon interval offset.

Example 9

The apparatus of example 8, the beacon component to randomly generate the discovery beacon interval offset.

Example 10

The apparatus of example 2, further including a first antenna array operably coupled to the first radio; and a second antenna array operably coupled to the second radio.

Example 11

The apparatus of example 2, further including a first antenna array operably coupled to the first radio and the second radio.

Example 12

The apparatus of any one of examples 1 to 3, the circuitry to comprise an application processor.

Example 13

The apparatus of any one of examples 1 to 3, the circuitry to comprise a baseband processor.

Example 14

The apparatus of any one of example 1 to 3, wherein the schedule is a schedule for communication in a Neighbor Aware Networking (NAN) cluster.

Example 15

The apparatus of any one of examples 1 to 3, the schedule to comprise indications of a discovery window for communication in a network.

Example 16

An apparatus for a device in a wireless network, the apparatus including circuitry; a scheduling component executable by the circuitry, the scheduling component to determine a schedule for communication using a first radio; and a beacon component executable by the circuitry, the beacon component to conduct a background scan to receive a discovery beacon using a second radio, the discovery beacon to include an indication of the schedule.

Example 17

The apparatus of example 16, further comprising the first radio operably coupled to the circuitry; and the second radio operably coupled to the circuitry, the second radio to utilize a lower amount of power relative to the first radio.

Example 18

The apparatus of example 17, the scheduling component to send a control directive to power on the first radio based at least in part on the schedule.

Example 19

The apparatus of any one of examples 16 to 18, wherein the schedule is a schedule for communication in a Neighbor Aware Networking (NAN) cluster.

Example 20

The apparatus of example 19, the discovery beacon to further include an indication of services available on the NAN cluster.

Example 21

The apparatus of example 20, the scheduling component to determine whether services available on the NAN cluster are needed, and the beacon component to repeat the background scan based on the determination that services available on the NAN cluster are not needed.

Example 22

The apparatus of any one of examples 16 to 18, the schedule to comprise indications of a discovery window for communication in a network.

Example 23

The apparatus of any one of examples 16 to 18, the beacon component to determine whether the discovery beacon was received.

Example 24

The apparatus of example 23, the beacon component to repeat the background scan based on the determination that the discovery beacon was not received.

Example 25

The apparatus of example 23, the beacon component to conduct the background scan using a first background scan interval, the beacon component further to repeat the background scan using a second background scan interval based on the determination that the discovery beacon was received, wherein the second background scan interval is different than the first background scan interval.

Example 26

The apparatus of example 23, the beacon component to send a control directive to power off the second radio based on the determination that the discovery beacon was received.

Example 27

The apparatus of example 17, the second radio to comprise a Bluetooth radio.

Example 28

The apparatus of example 17, the first radio to comprise a Wi-Fi radio.

Example 29

The apparatus of example 17, further including a first antenna array operably coupled to the first radio; and a second antenna array operably coupled to the second radio.

Example 30

The apparatus of example 17, further including a first antenna array operably coupled to the first radio and the second radio.

Example 31

The apparatus of any one of examples 16 to 18, the circuitry to comprise an application processor.

Example 32

The apparatus of any one of examples 16 to 18, the circuitry to comprise a baseband processor.

Example 33

A method implemented by a device in a wireless network, the method including determining a schedule for communication using a first radio; and generating a discovery beacon to be communicated using a second radio, the discovery beacon to include an indication of the schedule.

Example 34

The method of example 33, further comprising communicating the discovery beacon using the second radio in a discovery beacon window.

Example 35

The method of example 34, the discovery beacon window to comprise a discovery beacon interval and a discovery beacon interval offset.

Example 36

The method of example 35, further comprising randomly generating the discovery beacon interval offset.

Example 37

The method of example 33, further comprising sending a control directive to power on the second radio in order to communicate the discovery beacon.

Example 38

The method of any one of examples 33 to 37, further comprising repeatedly communicating the discovery beacon using the second radio.

Example 39

The method of any one of examples 33 to 37, the second radio to utilize a lower amount of power relative to the first radio.

Example 40

The method of any one of examples 33 to 37, the second radio to comprise a Bluetooth radio.

Example 41

The method of any one of examples 33 to 37, the first radio to comprise a Wi-Fi radio.

Example 42

The method of any one of examples 33 to 37, wherein the schedule corresponds to a Neighbor Aware Networking cluster.

Example 43

The method of any one of examples 33 to 37, the schedule to comprise indications of a discovery window for communication in a network.

Example 44

A method implemented by a device in a wireless network, the method including conducting a background scan to receive a discovery beacon, the discovery beacon to include an indication of a schedule for communication using a first radio, wherein the background scan is conducted using a second radio.

Example 45

The method of example 44, the second radio to utilize a lower amount of power relative to the first radio.

Example 46

The method of example 44, further comprising powering on the first radio based at least in part on the schedule.

Example 47

The method of any one of examples 44 to 46, wherein the schedule is a schedule for communication in a Neighbor Aware Networking (NAN) cluster.

Example 48

The method of example 47, the discovery beacon to further include an indication of services available on the NAN cluster.

Example 49

The method of example 48, further including determining whether services available on the NAN cluster are needed; and repeating the background scan based on the determination that services available on the NAN cluster are not needed.

Example 50

The method of any one of examples 44 to 46, the schedule to comprise indications of a discovery window for communication in a network.

Example 51

The method of any one of examples 44 to 46, further including determining whether the discovery beacon was received.

Example 52

The method of example 51, further comprising repeating the background scan based on the determination that the discovery beacon was not received.

Example 53

The method of example 51, further including conducting the background scan using a first background scan interval; and repeating the background scan using a second background scan interval based on the determination that the discovery beacon was received, wherein the second background scan interval is different than the first background scan interval.

Example 54

The method of example 51, further comprising sending a control directive to power off the second radio based on the determination that the discovery beacon was received.

Example 55

The method of any one of examples 44 to 46, the second radio to comprise a Bluetooth radio.

Example 56

The method of any one of examples 44 to 46, the first radio to comprise a Wi-Fi radio.

Example 57

An apparatus for a device in a wireless network, the apparatus comprising means to perform the method of any of examples 33 to 56.

Example 58

At least one machine readable medium comprising a plurality of instructions that in response to being executed on a transmitter node and/or a receiver node in a wireless network cause any one the transmitter node and/or receiver node to perform the method of any of examples 33 to 56.

Example 59

An apparatus for a wireless network including a processor; a radio operably connected to the processor; one or more antennas operably connected to the radio to transmit or receive wireless signals; and a memory comprising a plurality of instructions that in response to being executed by the processor cause the processor or the radio to perform the method of any of examples 33 to 56.

The invention claimed is:

1. An apparatus, comprising:
   processing circuitry;
   memory storing instructions operable on the processing circuitry, the instructions, when executed, cause the processing circuitry to:
   generate a Bluetooth discovery frame for communication by a first radio, the Bluetooth discovery frame comprising neighbor aware networking (NAN) capability information to indicate service discovery is supported by a second radio in a NAN cluster;
   cause the first radio to communicate the Bluetooth discovery frame, the first radio comprising a Bluetooth radio; and
   cause the second radio to communicate to perform the service discovery for services in the NAN cluster, the second radio comprising a Wi-Fi radio.

2. The apparatus of claim 1, the processing circuitry to cause the second radio to exit a lower power state to perform the service discovery subsequent to communication of the Bluetooth discovery frame.

3. The apparatus of claim 1, the Bluetooth discovery frame comprising a definition of one or more services available in the NAN cluster.

4. The apparatus of claim 1, the processing circuitry to cause the second radio to communicate to perform the service discovery during a discovery window.

5. The apparatus of claim 1, the Bluetooth discovery frame comprising NAN identifier information to identify the NAN cluster.

6. The apparatus of claim 1, the Bluetooth discovery frame comprising Wi-Fi Alliance (WFA) NAN protocol information to indicate one or more of type and version of the NAN cluster.

7. The apparatus of claim 1, comprising the first radio and the second radio, the first radio and the second radio coupled with the processing circuitry and the memory.

8. The apparatus of claim 7, comprising one or more antennas coupled with the first radio and the second radio.

9. The apparatus of claim 1, comprising baseband circuitry coupled with the processing circuitry and the memory, the baseband circuitry comprising medium access control (MAC) circuitry, and physical layer (PHY) processing circuitry, the baseband circuitry to enable communication of the Bluetooth discovery frame.

10. A non-transitory computer-readable storage medium, comprising a plurality of instructions, that when executed, enable processing circuitry of an interface to:
generate a Bluetooth discovery frame for communication by a first radio, the Bluetooth discovery frame comprising neighbor aware networking (NAN) capability information to indicate service discovery is supported by a second radio in a NAN cluster;
cause the first radio to communicate the Bluetooth discovery frame, the first radio comprising a Bluetooth radio; and
cause the second radio to communicate to perform the service discovery for services in the NAN cluster, the second radio comprising a Wi-Fi radio.

11. The non-transitory computer-readable storage medium of claim 10, comprising a plurality of instructions, that when executed, enable processing circuitry to cause the second radio to exit a lower power state to perform the service discovery subsequent to communication of the Bluetooth discovery frame.

12. The non-transitory computer-readable storage medium of claim 10, the Bluetooth discovery frame comprising a definition of one or more services available in the NAN cluster.

13. The non-transitory computer-readable storage medium of claim 10, comprising a plurality of instructions, that when executed, enable processing circuitry to cause the second radio to communicate to perform the service discovery during a discovery window.

14. The non-transitory computer-readable storage medium of claim 10, the Bluetooth discovery frame comprising NAN identifier information to identify the NAN cluster.

15. The non-transitory computer-readable storage medium of claim 10, the Bluetooth discovery frame comprising Wi-Fi Alliance (WFA) NAN protocol information to indicate one or more of type and version of the NAN cluster.

16. An apparatus, comprising:
processing circuitry;
memory storing instructions operable on the processing circuitry, the instructions, when executed, cause the processing circuitry to:
receive a Bluetooth discovery frame by a first radio, the Bluetooth discovery frame comprising neighbor aware networking (NAN) capability information to indicate service discovery is supported in a NAN cluster frame, the first radio comprising a Bluetooth radio; and
cause a second radio to communicate to perform the service discovery for services in the NAN cluster, the second radio comprising a Wi-Fi radio.

17. The apparatus of claim 16, the processing circuitry to cause the second radio to exit a lower power state prior to performing the service discovery.

18. The apparatus of claim 17, the processing circuitry to determine whether one or more services desired are supported by the NAN cluster prior to causing the second radio to exit the lower power state.

19. The apparatus of claim 16, the Bluetooth discovery frame comprising a definition of one or more services available in the NAN cluster.

20. The apparatus of claim 16, the processing circuitry to cause the second radio to communicate to perform the service discovery during a discovery window.

21. The apparatus of claim 16, the Bluetooth discovery frame comprising NAN identifier information to identify the NAN cluster.

22. The apparatus of claim 16, the Bluetooth discovery frame comprising Wi-Fi Alliance (WFA) NAN protocol information to indicate one or more of type and version of the NAN cluster.

23. The apparatus of claim 16, comprising the first radio and the second radio, the first radio and the second radio coupled with the processing circuitry and the memory.

24. The apparatus of claim 23, comprising one or more antennas coupled with the first radio and the second radio.

25. The apparatus of claim 16, comprising baseband circuitry coupled with the processing circuitry and the memory, the baseband circuitry comprising medium access control (MAC) circuitry, and physical layer (PHY) processing circuitry, the baseband circuitry to enable communication of the Bluetooth discovery frame.

\* \* \* \* \*